(12) United States Patent
Koike

(10) Patent No.: US 8,647,063 B2
(45) Date of Patent: Feb. 11, 2014

(54) MULTI-ELEMENT BLADE WITH AERODYNAMIC PROFILES

(75) Inventor: Bento Massahiko Koike, Sorocaba (BR)

(73) Assignee: Tecsis Tecnologia Sistemas Avançados S.A., Sorocaba (BR)

( * ) Notice: Subject to any disclaimer, the term of this patent is extended or adjusted under 35 U.S.C. 154(b) by 644 days.

(21) Appl. No.: 12/282,861

(22) PCT Filed: Mar. 13, 2007

(86) PCT No.: PCT/IB2007/050855
§ 371 (c)(1),
(2), (4) Date: Sep. 12, 2008

(87) PCT Pub. No.: WO2007/105174
PCT Pub. Date: Sep. 20, 2007

(65) Prior Publication Data
US 2009/0081047 A1 Mar. 26, 2009

(30) Foreign Application Priority Data
Mar. 14, 2006 (BR) ........................ 0600613

(51) Int. Cl.
*F03D 1/06* (2006.01)
(52) U.S. Cl.
USPC ............. 416/88; 416/89; 416/223 R; 416/234
(58) Field of Classification Search
USPC ........................ 416/88, 89, 223 R, 234, 235
See application file for complete search history.

(56) References Cited

U.S. PATENT DOCUMENTS

| | | | |
|---|---|---|---|
| 4,423,333 A | 12/1983 | Rossman | |
| 5,527,151 A | 6/1996 | Coleman et al. | |
| 5,570,859 A | 11/1996 | Quandt | |
| 6,164,599 A | 12/2000 | Piening et al. | |
| 7,582,977 B1 * | 9/2009 | Dehlsen | ........................ 290/1 R |
| 8,011,887 B2 * | 9/2011 | Fisher et al. | .................... 416/23 |
| 2003/0091436 A1 | 5/2003 | Stiesdal | |
| 2004/0105752 A1 | 6/2004 | Wobben | |

FOREIGN PATENT DOCUMENTS

| | | |
|---|---|---|
| CA | 2425447 A1 | 10/2004 |
| DE | 41 32 453 A1 | 4/1992 |
| DE | 41 32 463 A1 | 4/1993 |
| DE | 4428731 A1 | 2/1996 |
| DE | 10233102 | 1/2004 |
| EP | 0283730 B1 | 9/1988 |
| EP | 295353 A1 | 12/1988 |
| EP | 0375382 A2 | 6/1990 |
| EP | 1375911 A1 | 1/2004 |
| EP | 1524431 A1 | 4/2005 |
| EP | 1 887 219 A1 | 2/2008 |
| ES | 2035118 | 4/1993 |
| JP | 61-167175 A | 7/1986 |

(Continued)

*Primary Examiner* — Anh Mai
(74) *Attorney, Agent, or Firm* — Sughrue Mion, PLLC

(57) ABSTRACT

Provided is a multi-element rotor blade, including a primary element and at least one complimentary element, each having an aerodynamic profile. The primary element is joined by fastening elements to the at least one complimentary element such that the at least one complimentary element is adjacent to the primary element in a chordwise direction perpendicular to an axis of rotation of the blade and perpendicular to a longitudinal length of the blade. The at least one complimentary element is disposed closer to a blade root end of the primary element than to an opposite end of the primary element.

7 Claims, 4 Drawing Sheets

(56) References Cited

FOREIGN PATENT DOCUMENTS

| JP | 2005-90332 A | 4/2005 |
| LV | 12972 B | 3/2003 |
| LV | 13091 B | 12/2003 |
| WO | 01/46582 A2 | 6/2001 |
| WO | 02/053908 A1 | 7/2002 |
| WO | 03/076802 A1 | 9/2003 |
| WO | 2004/088130 A1 | 10/2004 |
| WO | 2004/099608 A1 | 11/2004 |
| WO | 2005/040559 A1 | 5/2005 |
| WO | WO 2006008327 A1 | 1/2006 |
| WO | 2006/128940 A1 | 12/2006 |
| WO | 2007/045244 A1 | 4/2007 |

* cited by examiner

MULTI-ELEMENT BLADE WITH AERODYNAMIC PROFILES

TECHNICAL FIELD

This invention refers to the technical field of mechanisms to convert kinetic energy of natural wind into useful mechanical power with the aim of generating electric power, more particularly the constructive arrangements applied on wind turbine rotors blades.

BACKGROUND ART

Electricity production by means of wind energy is among renewable energy sources that had the most development in recent years. This growth is due to this source's attractive characteristics, mainly when the ecological benefits are considered, such as the low environmental impact, non-emission of gases, radioactive particles or residues. Furthermore, arrangements adopted in wind energy plants allow rapid addition of extra modules in cases of increase in energy demand. In addition, since the base of the support structures for the wind turbines occupies reduced area, the adjacent areas can be used for other purposes, like agriculture.

Said wind turbines are basically made up of a support structure, such as a tower; the rotor, usually made up of three blades connected to a central disk; besides the power generator itself, which stays inside a capsule called nacelle, and transmission and control mechanisms.

As a result of said increase in the demand for a clean, safe and renewable electric power source, there is a strong need to optimize all constructive aspects of wind turbines, so as to provide a greater electric power generating capacity. Therefore, there is a tendency for economically feasible solutions to end up resulting in rotors with increasingly greater dimensions. These improvements, however, cause several difficulties in the logistic processes, among which are particularly highlighted the handling, storage and transportation of the structures, by land, sea or air.

More specifically, one of the reasons for increase in rotor dimensions is to increase efficiency of wind generators, in addition to increase in the longitudinal dimension, the blades of the wind turbine rotors are preferably designed with a chord (i.e. width of the blade profile) in the blade root (i.e. region near the rotor center) with high dimension. This way, these blades have high cost of transport due to the singular geometry, with great longitudinal and transversal dimensions, requiring special cares to prevent damages during the logistic procedures. For land transport, for example, blades with transversal dimensions greater than three (3) meters can no longer transit freely in the road systems of several countries. Today, blades with greater dimensions already exceed this limit and suffer many restrictions to reach the installation site of the wind turbine. Furthermore, the larger the blades the greater the problems to use standard handling equipment such as hoists; as well as standard storage and transport packages. On the other hand, when changes are made in the blades only in function of problems in the logistic procedures, without concern with issues of performance and aerodynamic control, there is a great loss in the capacity and versatility of the power generation of wind turbines. There are therefore, in the prior art, several constructive arrangements that aim at obtaining a blade of easy transport, storage and handling; while other arrangements aim at obtaining only improvements in performance and aerodynamic control. Few solutions, however, are concerned with both factors at the same time.

For example, the patent application published under No. US2004/0105752 describes a rotor blade for wind turbine with an acting surface of the wind with a variable area Said surface is obtained by means of a blade made up of a deformable or movable part with, consequently, less load for installation and greater ease of transport. In a better mode of execution described in this application, a part of the surface can be made of a deformable material forming a closed recipient. In this case, the recipient can be filled by a gaseous medium with a predetermined pressure. This way, this inflatable surface can be emptied during transport or in situations of extreme winds, reducing the area of the wind's operation. As a result, the load on the other components can be reduced, including on the tower. A similar solution is adopted in the patent application published under No. DE10233102A1.

Other types of arrangements found in the prior art, however, more specifically directed toward problems of performance and aerodynamic control, consider the use of high-lift devices, such as flaps, both in fixed or rotary airplane wings and in wind turbines, such as in the patent application published under No. EP152443 µl, which has other similarities with the solutions, adopted in U.S. Pat. Nos. 5,527,151 and 5,570,859 and in the patent application published under No. ES2035118T. U.S. Pat. No. 5,527,151 describes an aileron embodiment for wind turbine rotors, said aileron having a bottom surface such that it does not protrude in the airflow. The movement is executed around the center of rotation located within the envelope of the aileron, so as to allow positive control of the rotation. This movement of the aileron allows positioning it such that it creates enough drag to stop rotation of the rotor. U.S. Pat. No. 5,570,859 describes a blade spoiler for wind turbines or wings that controls or influences the airflow over the blade or wing surface. The spoiler can turn around in a way that its projects the anterior end over the low-pressure region at the same time that the posterior end is projected over the high-pressure region. When the spoiler is fully pivoted (orthogonal to the blade or wing longitudinal plane), it works as a brake, while when it is partially pivoted, it works as a power modulator. Meanwhile, patent No. ES2035118T describes a streamlined body with variable profile, having a stretched membrane over the surface so as to allow an inflated or water-filled configuration to vary the profile. Said streamlined body has a shape similar to that of an airplane wing, comprising an aileron and a small plate. This way, the body allows greater curvature of the profile, enabling increase of lift. Additional variations of high-lift device arrangements in blades are also foreseen in the U.S. Pat. No. 4,423,333, in the patent application published under No. US2003/0091436A1 and in the international pub-lications under No. WO2004/099608A1, WO03/076802A1 and WO2005/040559A1.

The patent application published under No. CA2425447A1 describes a blade for applications such as in wind turbines, made up of a main airfoil and a smaller secondary airfoil, preferably in the canard configuration. The airfoils are joined by means of at least two structural elements, resistant to vibrations and with aerodynamic profile perpendicular to the longitudinal axis of the airfoils, distributed along the secondary airfoil. In order to guarantee aerodynamic stability, the blade is balanced by means of rotation in relation to the longitudinal axis.

Other devices that adopt elements adjacent to the blades are found in patents No. LV12775(W002053908A1); LV12972and LV13091, in which the use of blades with cascaded profiles is proposed, in order to increase energy use with reduction of the starting wind. While in documents No. LV12775and LV 12972, the arrangement is appropriate for vertical axis wind turbines, in document No. LV13091 the use of a configuration similar to that of document No. LV12972 is proposed, but with a horizontal axis of rotations. However, although the axis of rotation proposed is horizontal, the solution adopted has the rotation of cascaded profiles parallel to the axis of rotation. A similar solution is adopted in the patent application published under No. JP2005-90332

Finally, another configuration is foreseen in the patent application published under No. DE4428731, which describes a blade with variable length, obtained by means of an external blade with hollow profile, inside which there is a section of telescopic blade over at least part of the extension, which can move over a fixed rail outwards of the external blade. Therefore, by modifying its length, it is possible to meet different transport conditions, as well as varied wind conditions. A similar result is obtained in the international publication under No. WO20061008327A1 and in the patent application published under No. EP1375911A1.

DISCLOSURE OF INVENTION

Technical Problem

The solutions cited in the above documents and other existing in the prior art do not, however, conveniently and effectively solve some problems existing in the prior art of wind turbine rotor blades.

For example, the documents No. US2004/0105752 and DE10233102A1 describe a solution that, despite facilitating the blade transport, does not present an effective use of the wind energy. This is because the surface on which the wind acts with a variable area is limited to reproduce the aerodynamic profile that an ordinary blade would have. Therefore, the maximum energy efficiency is limited to that which would be obtained by an ordinary blade. In these cases, the use of blades with high surface continue being necessary to reach the desired energy use.

Meanwhile, document No. EP0375382, despite describing a solution for the problem of noise generation in configurations comprising additional elements, such as flaps, it employs a complex configuration of flaps and actuators, of difficult application in wind generators due to the additional load that would be imposed on the structure assembly for wind energy utilization. In another manner, documents No. U.S. Pat. Nos. 5,570,859 and 5,527,151 describe brakes for wind turbines; however, said configurations also have less resistant structures due to the greater bending effort in the point of fixation of additional elements, which constitute points of greater susceptibility to fatigue. Furthermore, the presence of actuating mechanisms represents an increase in the load that the structure should support. The same occurs with the arrangement proposed in documents EP1524431A1, US 2003/0091436 and WO 2004/099608, which describe a system of flaps or high-lift devices for wind turbines that act only in the control of aerodynamic flow around the blade, having aerodynamic deficiencies when operating in low starting wind conditions, as well as not presenting advantages from the point of view of the logistic procedures. The same problems are found in the solution described in document No. ES2035118T, which due to the geometry used is also little efficient with regard to the logistic procedures.

Document CA2425447 mentioned supra describes a solution in which both airfoils are at a distance that prevents aerodynamic interference of one over the other, which improves control of the blades, but does not have improvements in energy use. Furthermore, the fastening system proposed by means of some elements located at some points along the structure provides greater concentration of the stress efforts when applied in large parts, requiring reinforcement of the blade structure.

On the other hand, the cascaded arrangements proposed in documents No. LV12775 and LV12972 with vertical axis of rotation have limited power generating capacity if compared with those with horizontal axis; while the one with horizontal axis of rotation, LV13095, has a constructive arrangement absolutely non-applicable for large sized wind turbines, to the extent that the cascaded profiles are parallel to the axis of rotation needing two points of support. This way, said arrangement is more appropriate for small-sized wind turbines with low efficiency.

Finally, document No. DE4428731 describes a telescopic configuration with easy transport in relation to conventional blades; however, said concept substantially impairs the aerodynamic performance of the blade since when the telescopic segment is moved to increase longitudinal dimension, the region with greater chord is withdrawn from the rotor base. Furthermore, said configuration requires a complex system to move the telescopic segment, which besides being liable to fatigue, renders extremely expensive the set without presenting a proportional increase in efficiency.

Therefore, as one can see, the solutions in the background art do not conveniently solve the problems existing in prior art, especially with regard to the obtainment of a blade with efficient aerodynamic features, but that at the same time is easy to transport, store and handle.

Technical Solution

The objective of this invention is therefore to obtain rotor blades for large-sized horizontal axis wind turbines that allow easy transport, handling and storage at the same time guaranteeing greater efficiency in the use of wind energy.

In addition to the blade having a versatile arrangement for logistic purposes but at the same time resulting in a more efficient use of wind energy, another purpose of this invention is that said more efficient use includes the use of weaker winds, reducing the starting torque.

Another objective of this invention is to maximize the annual energy generation rate for different parameters of wind distribution.

Another objective of this invention is to increase resistance of the blades to extreme loads and fatigue.

Yet another objective of this invention is to reduce the overall cost of a blade, taking into account not only the production cost of said blade, but also the transport and installation cost.

To attain the aforementioned objectives and other purposes, this invention basically has one of said blades equipped with at least two elements arranged collaterally and joined by fastening elements, wherein the elements complementary to the primary element are positioned in the region closer to the blade root, forming profiles fixed between each other, aiming at an aerodynamic interference between said profiles so as to increase aerodynamic performance and a starting in weak winds and at the same time facilitating the logistic procedures in function of the possibility of storing, transporting and handling the elements separately.

Preferably, said profiles comprise a primary element, which has the shape of an ordinary wind turbine blade, but with a smaller chord at the root; while the supplementary aerodynamic profiles complement the primary element's reduced area. Each complementary element may have the same geometry as the primary element's reduced area; or sequentially, the reduced form of the preceding complementary element. According to the winds of the region in which the wind turbine will be installed, the elements can take up different shapes aiming at greater control or a greater aerodynamic efficiency. The best results from the general point of view, considering both control and efficiency, as well as logistic and constructive issues, are obtained with the use of two or three elements for each blade.

Said elements can be fixed between each other by two or more fixed aerodynamic structures, preferably coupled in a way that they distribute the loads along the surfaces of said elements and without pivoting points.

Advantageous Effects

The use of a blade divided into two or more elements allows the primary element, which is larger, to be made up of a profile with a relatively small chord. This way, the assembly of multi-element blades can be transported, handled and stored separating the complementary aerodynamic profiles, which reduces the dimensions of said blade and greatly facilitates the logistic procedures. It is also possible to transport the complementary elements, for example, in the same truck transporting the primary element, placing the primary complementary element collaterally to the primary element, however with the root of the first complementary element near the edge of the primary element. The other complementary elements can also be arranged similarly, each one in the opposite direction to the former.

The use of two or more collateral aerodynamic profiles in the region of the larger chord also has the additional effect of increasing the blade's aerodynamic efficiency. The best performance is provided by the aerodynamic interference generated between the profile elements, to the extent that the joint action of the elements increases the maximum lift coefficient and the angles of attack without causing early stall. In addition, the arrangement of profiles concentrated in the region of the blade root generates greater lift coefficient in this region, where the tangential speed is low, thus guaranteeing better energy use of weak winds (cut in) in this part as well.

In addition, as a fastening system, it is easy to install in the field, allowing quick assembly and installation in the wind energy plant, since it preferably has no pivotable parts. Furthermore, the fastening system itself can constitute a profile with complementary aerodynamic profile, eliminating vortices from the edge of the elements.

DESCRIPTION OF DRAWINGS

To facilitate understanding and execution of this invention, the following figures are given for illustration purposes and do not restrict the final form of the invention's constructive variants. Each component or identical/similar part illustrated is identified by a corresponding number.

BEST MODE

The best mode of executing this invention is basically constituted of a multi-element blade applied in horizontal axis wind turbine rotors with three blades perpendicular to the rotation axis, being that each one of said blades is made up of profiles fixed between each other, adopting two elements to form each blade, being that the complementary element is positioned in the region closer to the blade root, in the trailing edge region in the pressure side of the primary element.

MODE FOR INVENTION

The various modes of execution of this invention are not limited to the constructive details explained in this description and figures, to the extent that this invention can be realized by other equivalent configurations.

This invention, therefore, basically consists in a blade applied in horizontal rotation wind turbine rotors, with blades perpendicular to the axis of rotation, in which each one of said blades is made up of various elements forming aerodynamic profiles fixed between them by means of fastening elements, being that the elements forming profiles are positioned in the region closer to the blade root.

Figure 1:
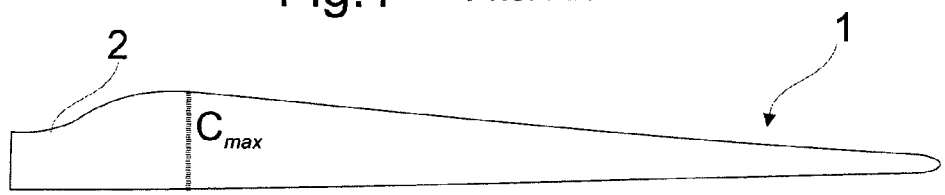
FIG. 1—shows a longitudinal plane view of a conventional blade.

FIG. 1 shows a longitudinal plane view of a conventional blade (1). As can be seen in this figure, the chord in the root is relatively greater than at the edge of the blade, being that in a certain straight section there is a maximum chord ($C_{max}$). Different geometries, sizes, internal structures and raw materials can be used to obtain a specific blade for a specific application, thus varying $C_{max}$; as well as distribution of the chord ($C_{dis}$) along the blade. The general parameters of C and C for each application type are already well known in prior art. For example, a typical conventional blade of 50 meters length currently sold in commercial scale has a $C_{max}$ varying in the range of 3 to 5 meters, while the minimum chord ($C_{min}$) is in the range of 0.5 to 1 meter; and the diameter (D) of the flange (2) connecting the blade root to the central disc of the rotor has approximately between 1 and 2 meters. As previously explained a $C_{max}$ greater than 3 meters renders road transport of the blade impossible in many countries.

Figure 2:
FIG. 2—shows a longitudinal plane view of a conventional blade in which a section that can be reduced is determined.

Thus, FIG. 2 shows the projection region (3) of an area segment that could be reduced in a conventional blade (1), thus reducing the $C_{max}$ so as to approach $C_{max}$ to the diameter (D) of the flange (2).

Figure 3:
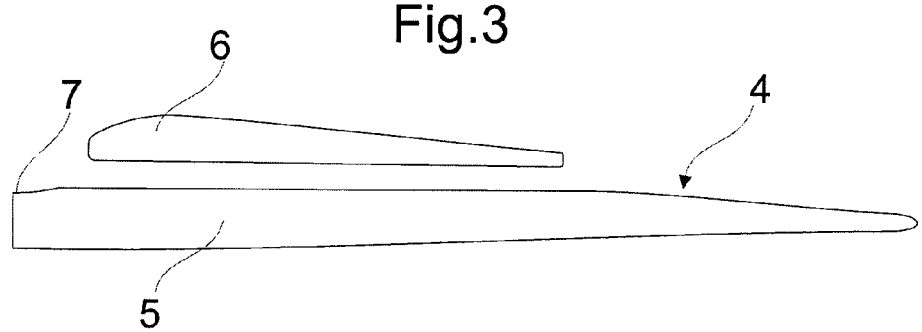
FIG. 3—shows a longitudinal plane view of a multi-element blade in which the secondary element is separated from the primary element for logistic purposes.
Figure 4:
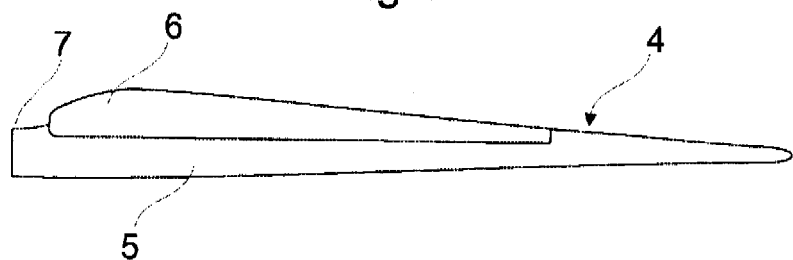
FIG. 4—shows a longitudinal plane view of a multi-element blade in which the complementary element is in the trailing edge region in the pressure side of the primary element.

FIG. 3 therefore shows a longitudinal view of a multi-element blade (4) according to this invention, in which the primary element (5) is separate from the complementary element (6) for transport, handling or storage purposes. Since the C of the primary element (5) becomes very close or even equal to the diameter D of the flange (7), a multi-element blade (4) with a diameter D of the flange (7) much greater than the D of the flange (2) of a conventional blade (1) can be transported; or from another point of view, with the C of the multi-element blade (4) greater than the $C_{max}$ of the conventional blade (1). According to the example previously mentioned in this description, the primary element (5) would have a C approximately between 1 and 2 meters, which would allow road transport of this multi-element blade. However, depending on the application desired, it is possible to make the section line of C of the primary element (5) not too close to the diameter D of the flange (7), but enough to enable transport of the primary element (5), being that according to the above-mentioned example, the $C_{max}$ would then be less than or equal to 3 meters.

Therefore, as can be seen from FIGS. 4 to 9, instead of positioning the complementary elements (6), (8) and/or (9) in the projection region (3), or positioning as if they were an airfoil that does not interfere in the airflow of the preceding element; said elements are positioned collaterally, which generates an aerodynamic interference between said profiles, to the extent that the joint action of the elements increases the maximum lift coefficient ($C_L$) and the angle of attack ($\alpha$) without causing early stall. In addition, the arrangement of profiles concentrated in the region of the blade root generates greater lift coefficient in this region, where the tangential speed is low, thus guaranteeing better energy use of weak winds (cut in) in this part as well. FIG. 10, in these wise, shows a graph of the lift coefficient ($C_L$) versus the angle of attack ($\alpha$) comparing a conventional blade with a multi-element blade according to this invention. As can be seen from this graph, with the same $\alpha$ of a conventional blade, the multi-element blade according to this invention has a $C_L$ greater than that of the conventional blade and reaches the stall point with a $\alpha$ greater than that of the conventional blade.

The number of complementary elements depends on a series of factors, such as number of blades, which can be two, three or four; desired performance; annual wind distribution in the geographic region where the tower will be installed, etc. For three-blade wind turbine rotors, which are nowadays the ones used in large scale, it is possible to use up to 5 elements, being that in most cases, the best results are obtained with 2 or 3 elements, to the extent that a certain radial distance must be kept between the blades without aerodynamic interference between said blades. In the case of two-blade wind turbine rotors, it is possible to also use more complementary elements, since the radial distance from the root of one blade to the other is greater.

In addition, it is also possible that the area of the multi-element blade (4) that was detached—which is relatively equivalent to the projection region (3) of a conventional blade (1), has a geometry similar to that of a conventional blade, however, with a distribution of the chord ($C_{dis}$) from the edge of the primary element (5) to the point of maximum chord ($C_{max}$) with an increase coefficient a little lower than the coefficients normally used. Thus, aerodynamic utilization in the root of the primary element is increased.

According to the needs and objectives, for example, the need for greater control or greater performance, the complementary elements can be installed in different positions in relation to the primary element. For example, as can be seen from FIG. 4 and respectively in FIG. 8, the complementary element (6) is positioned in the trailing edge region in the pressure side of the primary element (5) in the high-pressure region, which increases the maximum lift coefficient and angles of attack without early stall.

Figure 5:
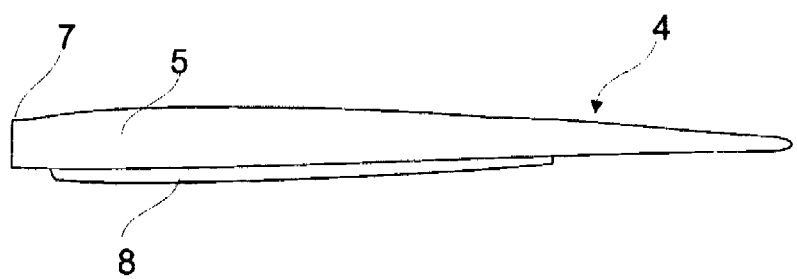
FIG. 5—shows a longitudinal plane view of a multi-element blade in which the complementary element is in the leading edge region in the suction side of the primary element.
Figure 6:
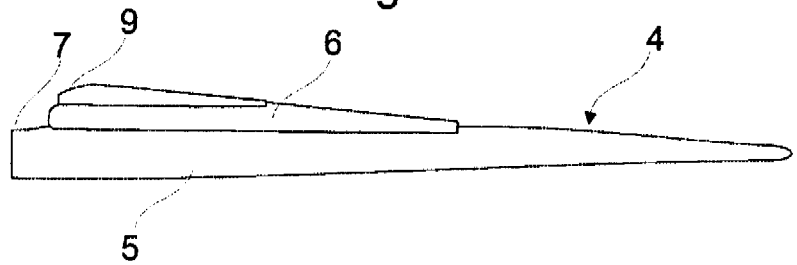
FIG. 6—shows a longitudinal plane view of a multi-element blade with three elements, in which the two complementary elements are in the trailing edge region in the pressure side of the primary element.
Figure 7:
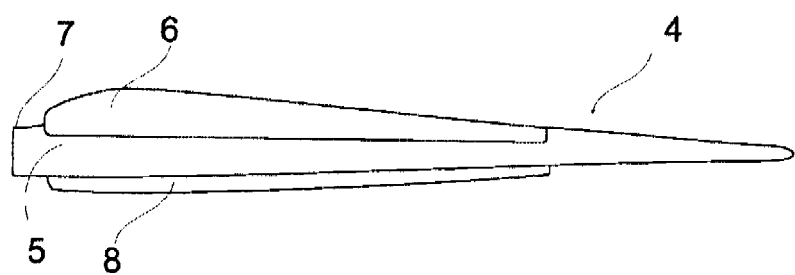
FIG. 7—shows a longitudinal plane view of a multi-element blade with three elements in which a complementary element is in the trailing edge region in the pressure side of the primary element and another complementary element in the leading edge region in the suction side of the primary element.

FIG. 5 shoes a mode of execution in which the complementary element (8) is positioned in the leading edge region in the suction side. In another mode of execution shown in FIG. 7, a complementary element (6) is positioned in the trailing edge region in the pressure side of the primary element (5) and a second complementary element (8) is positioned in the leading edge region in the suction side of the primary element. Other combinations are also possible, according to the specific need of the application.

Figure 8:
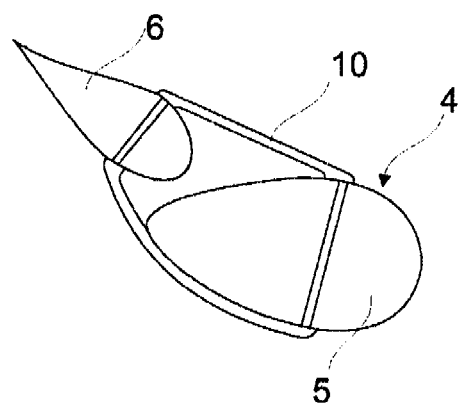
FIG. 8—shows a cross-sectional view of a multi-element blade in which the complementary element is in the trailing edge region in the pressure side of the primary element.
Figure 9:
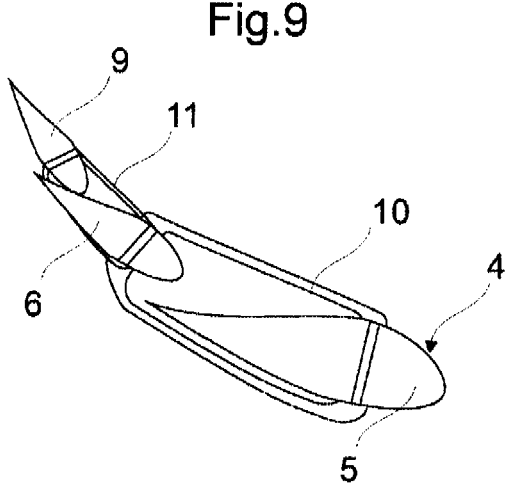
FIG. 9—shows a cross-sectional view a cross-sectional view of a multi-element blade with three elements, the two complementary elements being in the trailing edge region in the pressure side of the primary element.
Figure 10:
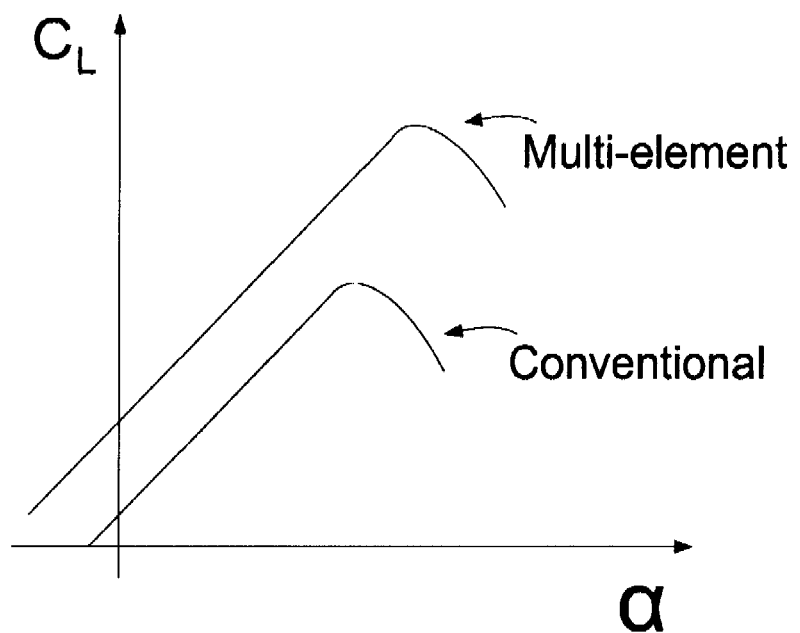
FIG. 10—shows a graph of the lift coefficient ($C_L$) versus the angle of attack ($\alpha$) comparing a conventional blade with a multi-element blade according to this invention.

FIGS. 8 and 9, which show a cross-sectional view of the multi-element blade (4), also show examples of fastening elements (10) and (11) that can be used to connect the elements among themselves. Since the fastening elements do not have pivoting points, the complexity of the system and risks of fatigue are thus reduced. In addition, the fastening system itself can constitute a profile with complementary aerodynamic function, eliminating vortices from the edge of the elements. The fastening elements (10) and (11) can be coupled to the primary (5) and complementary elements (6) and/or (9) through a locking system at predetermined points of the primary and complementary elements; or by means of a locking system with a longitudinal or transversal bar; or by joining the contact points with adhesive resins; or by a combination of the abovementioned elements; or by an external grid that connects the elements; or by other equivalent means. Therefore, to the extent that the fastening elements (10) and (11) allow connection of a primary element (5) to a complementary element (6), or of a complementary element (6) to another complementary element (9), said fastening can be done in the field, when assembling the blade (4) in the rotor.

Industrial Applicability

As can be seen from the abovementioned examples, this invention has wide industrial application in the field of wind energy generation, and can be reproduced in any plant with the necessary means and adequate technology to produce blades for large-sized wind turbine rotors, having special application in large-sized wind turbine rotors with horizontal axis of rotation and three blades perpendicular to said axis of rotation.

The invention claimed is:

1. A multi-element blade, for a wind turbine rotor in which a plurality of blades are arranged with a longitudinal direction perpendicular to an axis of rotation, the blade comprising:
   a primary element having an aerodynamic profile and at least one complementary element having an aerodynamic profile, wherein the at least one complementary element is disposed adjacent to the primary element in a chordwise direction, which is perpendicular to the axis of rotation and the longitudinal direction, such that an outer profile of a combination of the primary element and the at least one complementary element is discontinuous; and
   at least one fastening element which joins the primary element to the at least one complementary element wherein the at least one fastening element is coupled to one of a pressure surface and a suction surface of the primary element and one of a pressure surface and a suction surface of the at least one complementary element;
   wherein at least one of the at least one complementary element is disposed toward a trailing edge side of the primary element, and wherein said at least one complementary element is disposed closer to a blade root end of the primary element than to an end of the primary element opposite the blade root.

2. The multi-element blade according to claim 1, wherein the at least one complementary element comprises n complementary elements, where n is a number of complementary elements which can be coupled to the primary element without the resulting multi-element blade causing aerodynamic interference in another of the plurality of blades of the wind turbine rotor.

3. The multi-element blade according to claim 1, wherein profiles of the at least one fastening element complements the aerodynamic profile of the primary element.

4. The multi-element blade according to claim 1, wherein each of the primary element and the at least one complementary element has a substantially rigid structure, and the at least one fastening element holds the primary element and the at least one complementary element in a fixed relationship with each other.

5. The multi-element blade according to claim 1, wherein the at least one complementary element is disposed such that it is spaced in both a chordwise direction and a longitudinal direction from the primary element and such that a chord plane of the at least one complementary element intersects with a chord plane of the primary element.

6. The multi-element blade according to claim 1, wherein a maximum chord width of the primary element is substantially equal to a diameter of a root flange of the primary element.

7. The multi-element blade according to claim 1, wherein a chord plane of the at least one complementary element intersects a plane parallel to a perimeter of the root flange of the primary element.

* * * * *

UNITED STATES PATENT AND TRADEMARK OFFICE
CERTIFICATE OF CORRECTION

PATENT NO. : 8,647,063 B2
APPLICATION NO. : 12/282861
DATED : February 11, 2014
INVENTOR(S) : Bento Massahiko Koike It is certified that error appears in the above-identified patent and that said Letters Patent is hereby corrected as shown below:

On the title page item (73),

Delete "(73) Assignee: Tecis Tecnologia Sistemas Avançados S.A., Sorocaba (BR)"

Insert --(73) Assignee: Tecis Tecnologia E Sistemas Avançados S.A., Sorocaba (BR)--

Signed and Sealed this
Thirtieth Day of September, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,647,063 B2
APPLICATION NO. : 12/282861
DATED : February 11, 2014
INVENTOR(S) : Bento Massahiko Koike Page 1 of 1

It is certified that error appears in the above-identified patent and that said Letters Patent is hereby corrected as shown below:

Title page Item (73) Assignee, delete "Tecis Tecnologia E Sistemas Avançados S.A., Sorocaba (BR)" and insert --Tecsis Tecnologia E Sistemas Avançados S.A., Sorocaba (BR)--

Signed and Sealed this
Sixth Day of January, 2015

Michelle K. Lee
*Deputy Director of the United States Patent and Trademark Office*